Jan. 12, 1937.  E. GARNER, JR  2,067,388
POWER WINCH ATTACHMENT FOR MOTOR VEHICLES
Original Filed Sept. 17, 1931   2 Sheets-Sheet 2

Inventor
E. Garner, Jr.
By L. F. Randolph Jr.
Attorney

Patented Jan. 12, 1937

2,067,388

UNITED STATES PATENT OFFICE 2,067,388

POWER WINCH ATTACHMENT FOR MOTOR VEHICLES

Eugene Garner, Jr., Hebbronville, Tex.

Application September 17, 1931, Serial No. 563,387
Renewed June 16, 1936

1 Claim. (Cl. 254—166)

The invention relates to winches for windlasses adapted to be mounted on the frame of a motor vehicle and driven by the motor of the vehicle, and has for its object the provision of an improved construction of attachment of the class referred to whereby the winch or windlass structure is extremely stable so that the motor vehicle may be used for heavy lifting and towing, as well as for lowering casings, tubing, and tools into oil and other wells.

A further object of the invention is the provision of improved means for driving a winch or windlass reel mounted on the frame of an automobile or truck, including a shaft geared to the reel, and adapted to be clutched to the crank shaft of the vehicle motor, the clutch including a member formed as a part of the fan belt pulley of the motor.

A further object of the invention is the provision of a winch or windlass attachment for motor vehicles including brackets for supporting the reel of the windlass that are adapted to be secured to the side bars of the frame of the vehicle, and connected by means of crossed braces for stability of the supporting members, said braces having secured thereto a line guide for the reel.

Figure 1:
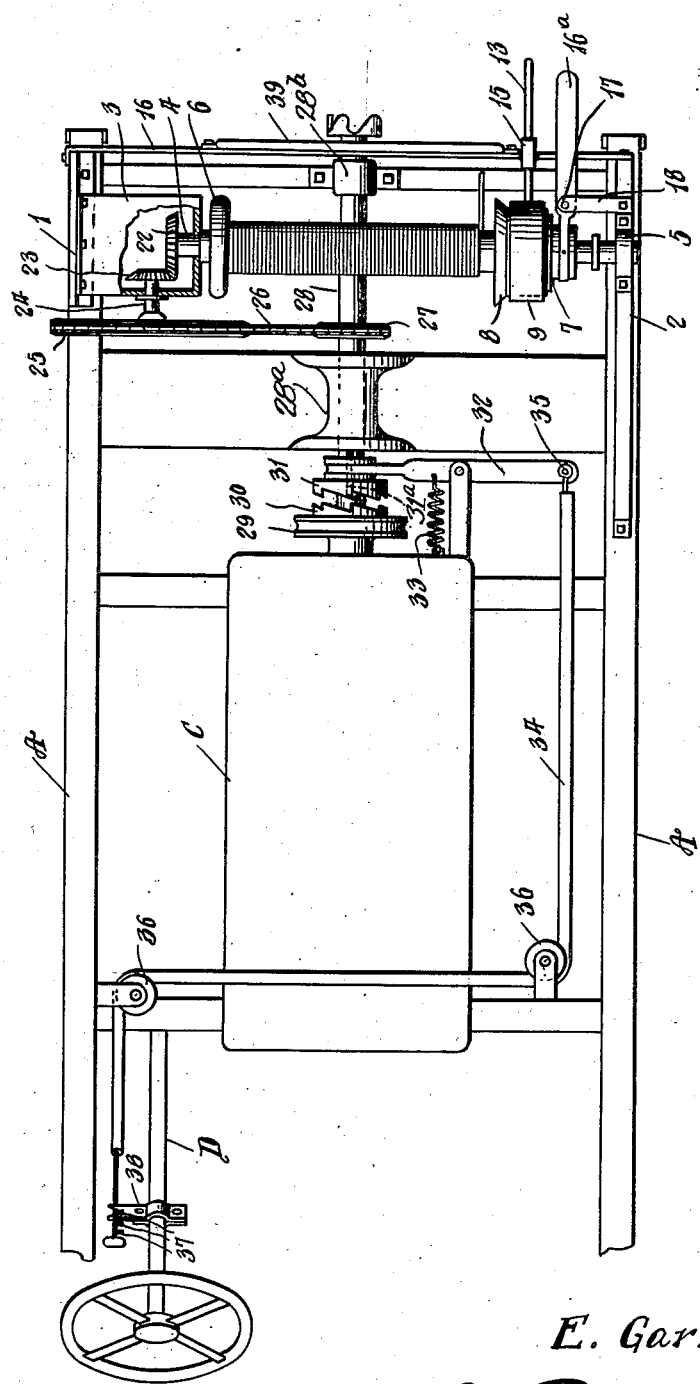
Figure 2:
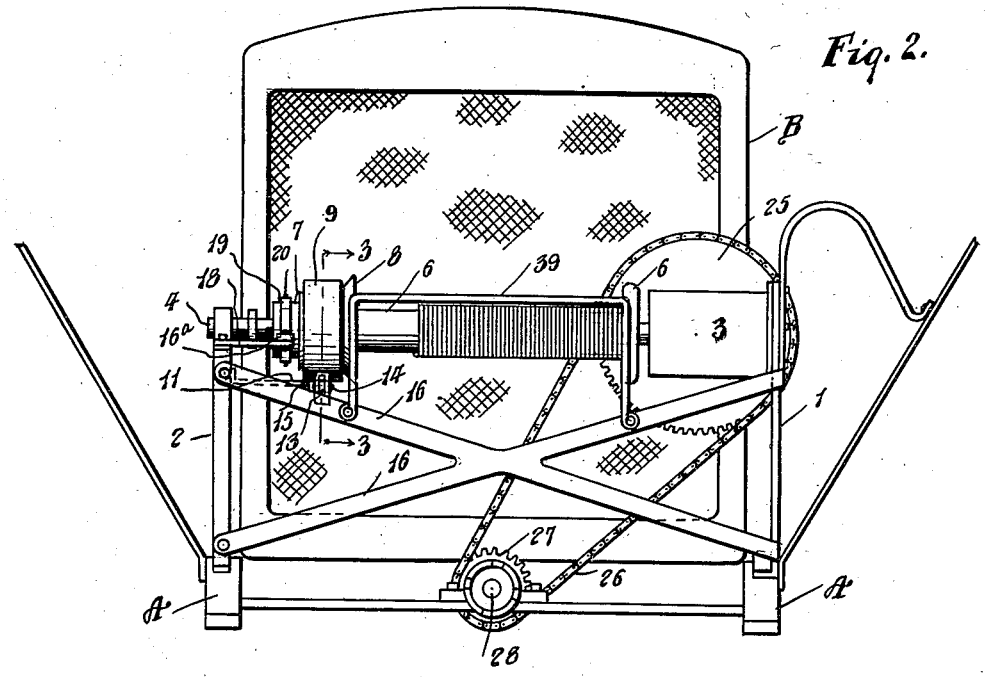
Figure 3:
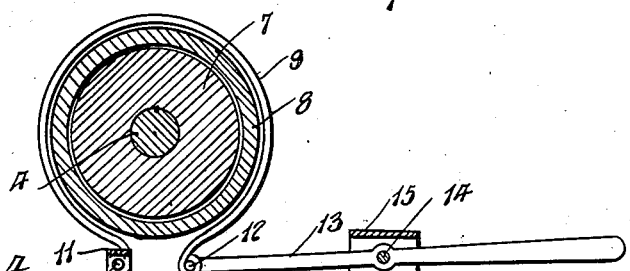
Figure 4:
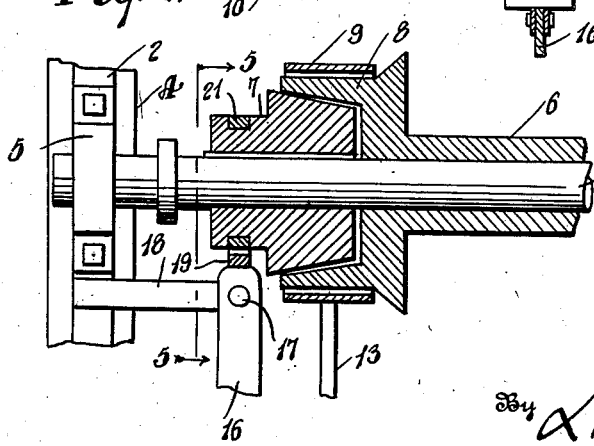
Figure 5:
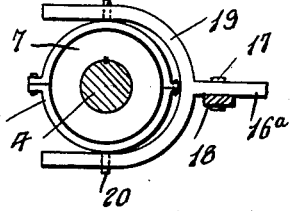

The invention will be described in detail hereinafter and will be found illustrated in the accompanying drawings in which Figure 1 is a plan view of the chassis of a motor vehicle, shown fragmentarily with the improved windlass attachment mounted thereon, Figure 2 is a fragmentary front view of the motor vehicle, and showing the attachment, Figure 3 is a transverse sectional view on a plane indicated by the line 3—3 of Figure 2, Figure 4 is a fragmentary detail view partly in section of the reel and associated parts, and Figure 5 is a sectional detail on a plane indicated by the line 5—5 of Figure 4.

In the drawings similar reference characters are used to designate corresponding parts in all of the views.

The windlass is, as heretofore stated, for attachment to the frame of a motor vehicle, and in Figure 1 is shown supported on the side bars or sills A of a motor vehicle chassis by means of brackets 1 and 2 and in front of the radiator B. 3 indicates a grease tight gear box secured to the bracket 1 so that the gearing in said box, and which will be hereinafter more specifically described, may at all times run in grease or other lubricant. 4 designates a reel shaft journaled in the wall of the gear box 3 and on the bracket 2 as shown at 5, and having rotatably mounted thereon a reel 6. 7 designates a cone clutch member splined on the shaft 4, and mating with the clutch housing 8 on one end of the reel 6. The outer face of the housing 8 provides a brake drum and 9 designates a brake band associated with the housing 8 and comprising therewith a brake for controlling the rotation of the reel 6, this brake being particularly useful when the reel is used for lowering articles, such for instance as casing, tubing and the like into oil or other wells. One end of the brake band 9 is secured as shown at 10 to a bracket 11 supported on bracket 2 while its other end pivotally engages as shown at 12 a hand operated lever 13 pivoted as shown at 14 to a bracket 15 mounted on one of the crossed braces 16 connecting the brackets 1 and 2. Clutch member 7 is adjusted by means of a lever 16$^a$ pivotally mounted as shown at 17 on an arm 18 secured to bracket 2, said lever 16$^a$ having a yoke 19 that pivotally engages as shown at 20 a split ring 21 secured on the clutch member 7.

22 indicates a bevel gear on the end of shaft 4 within the housing 3 that meshes with a bevel gear 23 on stub shaft 24 on which is also secured a sprocket wheel 25 that is geared by means of a chain 26 with a sprocket wheel 27 secured to shaft 28 that is journaled in bearing members 28$^a$ and 28$^b$, and in axial alinement with the crank shaft of the vehicle engine C. Secured to the end of the crank shaft of the engine is a fan belt pulley that has formed integrally therewith a clutch face 30. 31 indicates a clutch member adapted to mate with the clutch face 30 and is splined on the shaft 28, as shown at 31$^a$, and 32 indicates a lever for adjusting the clutch member 31 into and out of engagement with the clutch member 30. The means for actuating the lever 32 as shown in Figure 1 is a spring 33 that normally holds the clutch members in engagement, the lever being actuated to separate the clutch members by means of a flexible member 34 secured as shown at 35 to the free end of said lever 32 and trained around pulleys 36 mounted on the frame of the vehicle and having its free end arranged for convenient operation by the operator of the vehicle, and provided with pins or projections 37 engageable by means of a clip 38 secured to the steering post of the vehicle. 39 indicates a U-shaped member secured to the crossed braces 16, said member providing a guide for the line when being wrapped on the reel 6.

It will be understood that this improved power winch or windlass may be attached to any make of motor vehicle including motor trucks, and is extremely useful in farming and on ranches, and may also be used for pulling pipes, rods, and tools out of and lowering them into wells, and may also be used for stretching fences in addition to many uses on the farm, including pulling feed out of silos. It is also apparent that the device may be used for pulling the vehicle itself out of mud or mire, as well as for removing other cars that may be stalled.

What is claimed is:—

In combination with a motor vehicle having a supporting frame including side bars, supporting brackets secured to said side bars, a reel, means journaling said reel on said supporting brackets, a brace member secured to said brackets, an inverted U-shaped rope guide secured at its extremities to said brace member to support the loose end of a rope wound on said reel, and a shaft driven by the vehicle motor and geared to said reel.

EUGENE GARNER, Jr.